No. 841,133. PATENTED JAN. 15, 1907.
H. C. FARRELL.
VALVE.
APPLICATION FILED MAY 31, 1905.

Witnesses:—
Louis W. Gratz
May E. McArthur

Henry C. Farrell,
Inventor
by Geyer & Popp
Attorneys.

UNITED STATES PATENT OFFICE.

HENRY C. FARRELL, OF BUFFALO, NEW YORK.

VALVE.

No. 841,133. Specification of Letters Patent. Patented Jan. 15, 1907.

Application filed May 31, 1905. Serial No. 263,118.

*To all whom it may concern:*

Be it known that I, HENRY C. FARRELL, a citizen of the United States, residing at Buffalo, in the county of Erie and State of New York, have invented a new and useful Improvement in Valves, of which the following is a specification.

This invention relates to a valve in which the stopper is spherical or ball-shaped.

The object of this invention is the production of a valve of this character in which the ball-shaped stopper is connected with the stem by means which are very simple and inexpensive in construction and which permit of moving the stopper positively toward and from its seat and yet enable the same to change its position circumferentially, so as to present new surfaces to the seat, and thus prevent the stopper from wearing in one place and eventually causing leakage.

Figure 1:
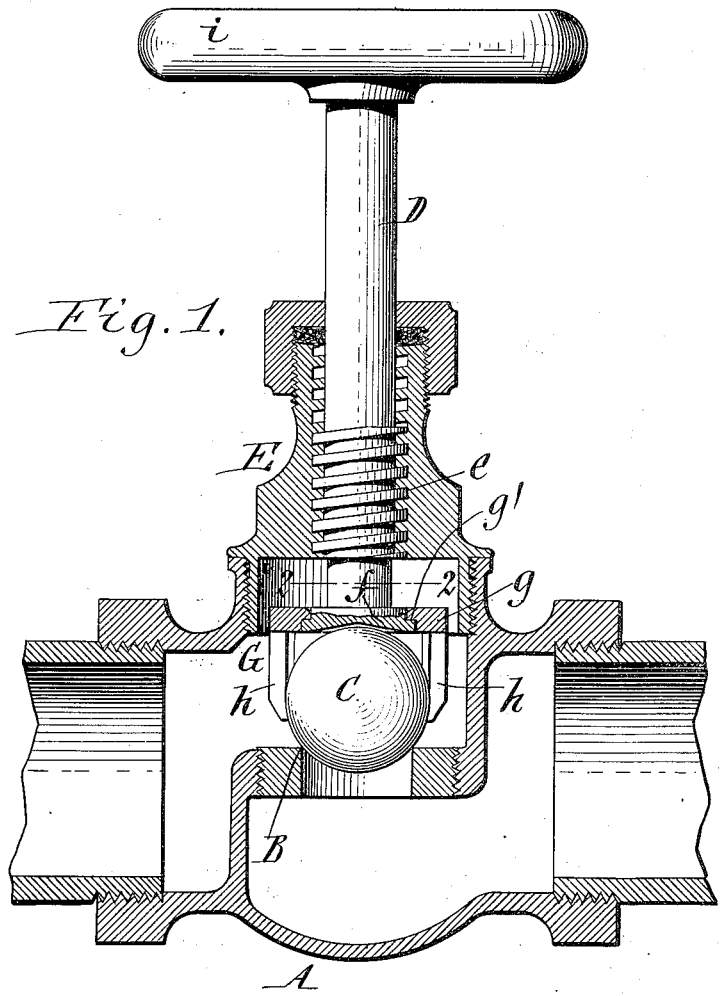
Figure 2:
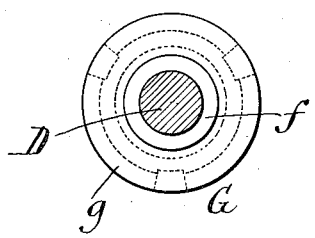
Figure 3:
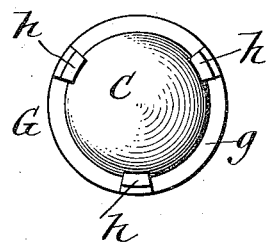

In the accompanying drawings, Figure 1 is a longitudinal section of a valve having a ball-stopper connected with the stem in accordance with my invention. Fig. 2 is a fragmentary section in line 2 2, Fig. 1. Fig. 3 is a front end view of the ball-stopper and the cage, whereby the same is connected with the stem.

Similar letters of reference indicate corresponding parts throughout the several views.

A represents the casing of the valve; B, the removable valve-seat arranged in the diaphragm between the inlet and outlet of the casing; C, the spherical or ball-shaped stopper, which is movable toward and from said seat for opening and closing the valve, and D the valve-stem whereby the stopper is shifted. This stem is movable lengthwise by means of a screw connection $e$ with the bonnet E of the valve-casing, and its inner or front end is provided with a circular head $f$.

G represents the cage or coupling whereby the valve-stem and stopper are connected. This cage consists of a ring or collar $g$, which surrounds the inner or front end of the stem and has a forwardly-facing shoulder $g'$, which bears against a corresponding shoulder on the back of the head $f$, and a plurality of claws or jaws $h$ projecting forwardly from the ring $g$ on different sides of the ball-stopper and engaging their front ends, with the stopper in front of its swell or largest diameter. The jaws are formed integrally with the ring, and their front ends are disconnected from each other, so that the entire cage consists of but a single piece.

In assembling the parts the ring of the cage is slipped forwardly over the stem and engaged with the back of the head thereon while the same is detached from the bonnet and the handle $i$ at its outer end. It is possible to slip the cage over the stem in this manner on account of the opening in its ring being sufficiently large to permit of passing the ring over the screw-thread of the stem. Preparatory to receiving the ball-stopper between them the jaws of the cage are spread apart sufficiently to permit the swell or largest diameter of the stopper to pass the free outer or front ends of the jaws. After the stopper has been introduced between the jaws the front ends of the same are pinched or pressed together sufficiently so that they engage with the ball-stopper in front of its largest diameter, and thereby confine the same in the cage. When the parts are thus assembled, the stopper bears on its rear side against the head of the stem and on its front side against the jaws of the cage, whereby the stopper serves to hold the cage against backward movement on the stem and the cage in turn holds the stopper against moving forward from the stem. These parts therefore hold each other in their proper relative position without the use of any separate device for this purpose, thus producing an exceedingly simple construction, which is not liable to get out of order. This means of connecting the stopper with the stem causes the stopper to move positively with the stem toward and from the seat; but sufficient looseness is provided between the ball-stopper, stem-head, and cage-jaws to permit the stopper to turn freely and prevent the wear from being concentrated on one place and causing the same to be distributed over different parts of the stopper, thereby prolonging the life of the valve and reducing the possibility of leakage to a minimum.

While new valves constructed in accordance with my invention are superior to those heretofore in use, my improvement is equally desirable for repairing old valves having flat stoppers, inasmuch as no change is required in the present form of valve-stems for permitting the application thereto of a ball-stopper by my improved connecting-cage.

I claim as my invention—

A valve comprising a casing having a seat, a ball-stopper for coöperating with said seat, a valve-stem movable toward and from said seat and having a head at its inner end which bears against the back of the stopper, and a coupling consisting of a ring bearing against a shoulder on the back of said head and having a plurality of integral jaws which extend forwardly from said ring and are bent inwardly so as to engage with the stopper in front of its largest diameter, whereby the stopper is held by the coupling against forward movement relatively to the stem and the stopper holds the coupling against backward movement on the stem, substantially as set forth.

Witness my hand this 27th day of May, 1905.

HENRY C. FARRELL.

Witnesses:
　THEO. L. POPP,
　E. M. GRAHAM.